Figure 1:
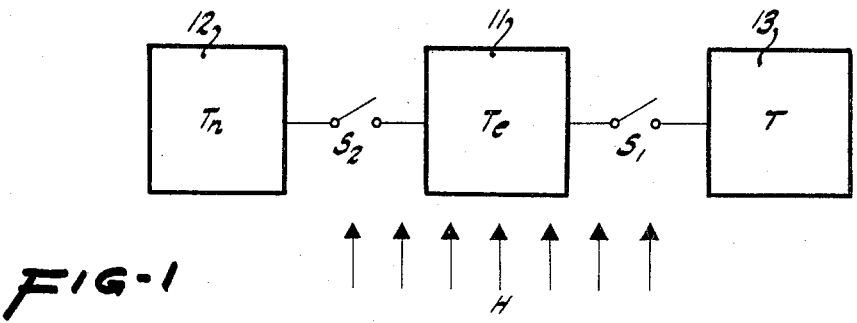

Oct. 25, 1966

C. D. JEFFRIES 3,281,661

NUCLEAR SPIN COOLING METHOD

Filed Nov. 18, 1963

2 Sheets-Sheet 1

INVENTOR.
CARSON D. JEFFRIES
BY
Lippincott, Ralls & Hendrickson
ATTORNEYS

Oct. 25, 1966

C. D. JEFFRIES 3,281,661

NUCLEAR SPIN COOLING METHOD

Filed Nov. 18, 1963

2 Sheets-Sheet 2

INVENTOR.
CARSON D. JEFFRIES
BY
Lippincott, Ralls & Hendricson
ATTORNEYS United States Patent Office 3,281,661
Patented Oct. 25, 1966

3,281,661

NUCLEAR SPIN COOLING METHOD

Carson D. Jeffries, Berkeley, Calif., assignor, by mesne assignments, to the United States of America as represented by the United States Atomic Energy Commission Filed Nov. 18, 1963, Ser. No. 324,514
6 Claims. (Cl. 324—.5)

The present invention relates to the temperature reduction of nuclear spins or polarization of nuclei, and is particularly directed to a novel method of cooling nuclear spins which employs the electron spin system of a crystal as a working medium or coolant between nuclear spins of the crystal and the crystal lattice and externally controllable complementary atomic states of the crystal as thermal switching mechanism for controlling the spin cooling cycle.

In the provision of polarized proton targets for nuclear scattering experiments, as well as in various maser, laser, and other applications of ever increasing importance, it is necessary to provide for the polarization of nuclei, i.e., the alignment of the spin magnetic moments of atomic nuclei in the same direction so as to provide a net macroscopic magnetic moment. Such nuclear polarization is equivalent to a reduction in the temperature of the spin magnetic moments of atomic nuclei (hereinafter referred to as nuclear spins). More particularly, it can be shown that the nuclear polarization of a paramagnetic crystal varies as an inverse function of the absolute temperature of the nuclear spins of the crystal. At nuclear spin temperatures closely approaching absolute zero, the nuclear polarization approaches 100%.

Various nuclear spin cooling methods are known which are capable of providing nuclear spin temperatures of the order of a millidegree absolute. In this regard, it is the usual practice to place a hydrated crystal of appropriate composition in a bath of liquid helium. A uniform magnetic field is established in the region of the crystal, and the crystal is irradiated with microwave energy. The magnetic field and microwaves are suitably adjusted so as to induce forbidden transitions between nuclear spin and electron spin energy levels of the crystal volume. This results in a re-arrangement of the relative populations of the spin energy levels which gives rise to a reduced nuclear spin temperature, e.g., of the order of several millidegrees absolute and a correspondingly enhanced nuclear polarization, e.g., of the order of 50%.

Aside from the desirability of providing lower nuclear spin temperatures, and correspondingly increased polarizations, than are attainable with previous nuclear spin cooling methods of the type outlined above, such methods are disadvantageous by virtue of the microwave generating equipment required in the conduct thereof. Not only is the microwave generating equipment undesirable from the standpoint of its complexity and relatively large expense, but, in addition, such equipment precludes the employment of conventional polarization methods in numerous applications.

The present invention overcomes the foregoing limitations and disadvantages by providing an improved method of nuclear spin cooling capable of providing relatively low spin temperatures of the order of a microdegree absolute and an attendant relatively high degree of nuclear polarization. Moreover, as an extremely important feature of the cooling method, same does not entail the generation of microwaves in its conduct. The cooling method may be likened to that conducted in a common refrigerator wherein a working medium or coolant is appropriately cycled to take in heat at a relatively low temperature from a system to be cooled and to reject the heat at a relatively high temperature to a thermal sink. However, quite unlike conventional refrigeration practice, in accordance with the present invention, nuclear spins of a crystal are cooled, not matter. More particularly, a crystal is separable into three systems; namely, the electron spins (e.g., paramagnetic ions), the nuclear spins (e.g., protons in the waters of hydration of the crystal), and the crystal lattice. The electron spins function as the working medium, the nuclear spins are the system to be cooled, while the crystal lattice serves as the thermal sink. In accordance with the basic aspects of the method, the crystal lattice is maintained at a temperature slightly greater than zero degrees absolute, as by immersing the crystal in a liquid helium bath. A magnetic field is established in the region of the crystal. First and second predetermined atomic states are then alternately established within the crystal. In the first state of the crystal, the electron spins are in good thermal contact with the lattice and in very poor thermal contact with the nuclear spins. In the second state, the converse situation exists, the electron spins being in very poor thermal contact with the lattice and in good thermal contact with the nuclear spins. Simultaneously with switching from the first to the second atomic state, the electron spins are cooled by adiabatic demagnetization. Thus, the electron spins are cooled to the lattice temperature in the first state of the crystal and during switching to the second state are adiabatically cooled to a much lower temperature. In the second state, the very cool electron spins cool the nuclear spins and are warmed irreversibly in the process. Upon re-establishment of the first state, the electron spins are again in thermal contact with the lattice and cooled to the temperature of the bath to initiate another cycle. The nuclear spins, being at all times thermally isolated from the lattice, are cooled a little each cycle and ultimately attain a temperature very much lower than the bath. The complementary atomic states of the crystal are controlled by particularly values of macroscopic external parameters, such as angle between a predetermined axis of the crystal and the magnetic field, or magnitude of the magnetic field. Switching between the atomic states and adiabatic demagnetization of the electron spins is accomplishable by variation of the external parameters, as is set forth more fully below.

The invention will be better understood upon consideration of the following detailed description taken in conjunction with the accompanying drawing, wherein:

FIGURE 1 is a schematic illustration of internal systems of a crystal which are interrlated with each other in a manner serving to illustrate the principles of the spin cooling method of the invention;

FIGURE 2 is an energy level diagram depicting electron and nuclear spin energies at two atomic states of the crystal system depicted in FIGURE 1;

FIGURE 3 is a graphical illustration of energy and $g$ factor dependence on angular orientation of a crystal with respect to an external magnetic field;

FIGURE 4 is a graphical illustration of one specific mode of conducting the spin cooling method of the invention; and FIGURE 5 is a graph of Zeeman energy versus applied external magnetic field depicting an alternative mode of conducting the spin cooling method.

Referring now to FIGURE 1, a paramagnetic hydrated crystal is schematically depicted as being comprised of three separate systems; namely, an electron spin system 11, e.g., paramagnetic ions, a nuclear spin system 12, e.g., the protons in the waters of hydration, and a crystal lattice 13. In the conduct of the spin cooling method of the invention, the electron spin system 11 functions as a working medium or coolant, while the nuclear spin system 12 is the system to be cooled, and the crystal lattice 13 serves as a thermal sink. The separate systems 11, 12, and 13 are thermally isolated from each other except through intrinsic atomically actuated thermal switching mechanisms $S_1$ and $S_2$ which, respectively, couple the electron spin system 11 to the crystal lattice 13 and couple the electron spin system 11 to the nuclear spin system 12. It will accordingly be appreciated that the nuclear spin system 12 is at all times thermally isolated from the crystal lattice 13 while the electron spin system 11 may be selectively placed in and out of thermal contact with the crystal lattice 13 and with the nuclear spin system 12 by appropriate control of the intrinsic thermal switches $S_1$ and $S_2$. The electron spin system 11 is depicted as having a temperature $T_e$ while the temperature of the nuclear spin system 12 is depicted as $T_n$ and the temperature of the lattice 13 is depicted as being T.

In accordance with the basic aspects of the spin cooling method of the present invention, the lattice temperature T is maintained at a value slightly greater than zero degrees absolute (0.°K.) as by immersing the crystal in a bath of liquid helium. This lattice temperature represents the sink temperature of the crystal and initially the temperatures of the respective systems of the crystal are in thermal equilibrium and, consequently, equal to the lattice sink temperature T. A magnetic field H is generated in the vicinity of the crystal preparatory to the initiation of the spin cooling cycle of the method which, in general respects, will be seen to be analogous to the cooling cycle of a conventional refrigerator. More particularly, in accordance with the method, first and second atomic states are alternately established in the crystal wherein, respectively, the electron spin system 11 is in thermal contact with the crystal lattice 13 while being thermally decoupled from the nuclear spin system 12, and the electron spin system is in thermal contact with the nuclear spin system while being decoupled from the crystal lattice. Thus, in effect, the intrinsic thermal switches $S_1$ and $S_2$ are respectively closed and open in state 1, and open and closed in state 2. Simultaneously with the conversion from the first to the second atomic state, the electron spin system 11 is isentropically cooled by adiabatic demagnetization to thereby reduce the temperature $T_e$ of the electron spin system to a value substantially less than the sink temperature T of the crystal lattice 13. Inasmuch as the relatively low temperature electron spin system 11 is in thermal contact with the nuclear spin system 12 in state 2 of the crystal, the electron spins now cool the nuclear spins and reduce the temperature $T_n$ of the nuclear spin system below the lattice sink temperature T. In effecting such cooling of the nuclear spin, the electron spins are warmed irreversibly. The crystal is now switched from state 2 back to state 1 to thereby decouple the electron spin system from the nuclear spin system and re-establish thermal contact between the electron spin system and the crystal lattice. The electron spin temperature is consequently reduced to that of the lattice while the temperature of the nuclear spin system remains at a value less than that of the lattice by virtue of the thermal isolation existing therebetween. Thereafter the cooling cycle is repeated a number of times with the nuclear spins being progressively incrementally reduced in temperature each cycle until an optimumly low temperature is attained.

As regards, more particularly, the establishment of atomic states in the crystal which are comparable to the actuation of thermal switches between the various systems of the crystal, it is to be noted that such states are controllable by particular values of macroscopic external parameters. More explicity, the spin wave function (probable position and orientation) of the electron spins is dependent on certain external macroscopic parameters in such a manner that in the first state of the crystal, corresponding to a first value of a given parameter, the energy level of the electron spins is substantially separated from that of the nuclear spins. Consequently, interaction between the electron spin system and nuclear spin system is of low probability in the first state of the crystal. In the second state of the crystal, dependent on a second value of the given external parameter, the energy level of the electron spins is comparable to that of the nuclear spins such that there is a high probability of interaction therebetween. This amounts to effective decoupling of the electron spin system from the nuclear spin system in the first atomic state of the crystal and effective thermal coupling between the respective systems in the second state of the crystal. Thus, the relatively wide separation between electron spin and nuclear spin energy levels established in state 1, in effect constitutes an open condition of thermal switch $S_2$ between the electron and nuclear spin systems. This relatively close proximity of the electron spin and nuclear spin energy levels established in state 2, in effect constitutes a closed thermal switch $S_2$ between the electron and nuclear spin systems.

Figure 2:
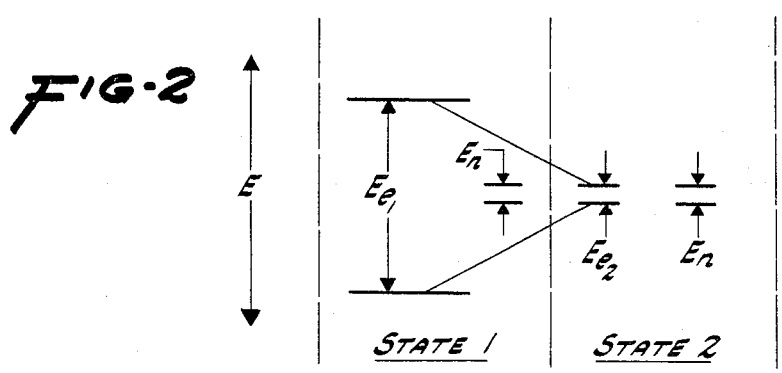

The foregoing will be better understood upon reference to the energy level diagram of FIGURE 2 wherein it is to be noted that in state 1, the electron spin energy $E_{e_1}$ is substantially greater than the nuclear spin energy $E_n$. Moreover, the energy levels defining the nuclear spin energy will be noted to be widely separated from the energy levels defining the substantially greater electron spin energy. However, upon appropriate external control of the electron spin wave function, state 2 is attained in the crystal wherein the energy level of the electron spins is of a much smaller value $E_{e_2}$, substantially equal to the nuclear spin energy level $E_n$. The energy levels of the electron spins and nuclear spins are at this time comparable and relatively close together such that the electron spins and nuclear spins undergo mutual spin flips by virtue of their dipole-dipole coupling. Such a cross relaxation process establishes a common spin temperature for the electron spin-nuclear spin system, as will be subsequently described in detail herein.

The change in electron spin energy which accompanies a conversion from state 1 to state 2 is made to occur isentropically (i.e., the ratio of energy to temperature is maintained constant), such that the temperature of the electron spins in state 2 is, hence, substantially reduced from that of the electron spins in state 1. Inasmuch as the electron spins and nuclear spins are in good thermal contact in state 2, and a common spin temperature is established for the electron-nuclear system, the nuclear spin temperature is likewise reduced.

As a further requirement of the first and second atomic states of the crystal, the electron spin system 11 must be effectively thermally coupled to the crystal lattice 13 in state 1 and effectively decoupled from the crystal lattice in state 2. This is herein accomplished by the employment of crystals having a very short electron spin-lattice relaxation time in state 1 and an appreciable electron spin-lattice relaxation time in state 2. The very short electron spin-lattice relaxation time is consonant with the establishment of good thermal contact between the electron spin system and crystal lattice, and, in effect, amounts to closure of a thermal switch $S_1$, therebetween. With an appreciable relaxation time established between the electron spin system and lattice, there is slight chance of interaction, thus amounting to an open condition of a thermal switch $S_1$ between the electron spin system and lattice. The variation in electron spin-lattice relaxation time between the respective states of the crystal is simultaneously controllable with the variation in electron spin energy in response to variation of the external macroscopic parameters.

Considering now various external macroscopic parameters which may be varied to establish complementary atomic states in the crystal which, in effect, constitute actuation of atomically controlled thermal switches $S_1$ and $S_2$ in the manner described hereinbefore, it is first to be noted that the electron spin energy $E_e$ is given by:

$$E_e = g_e \beta H,$$

where $g_e$ is the electron spin $g$-factor, $\beta$ is the Bohr magneton, and H is the applied external magnetic field. Similarly, the nuclear spin energy $E_n$ is given by:

$$E_n = g_n \beta H,$$

where $g_n$ is the nuclear spin g-factor. Thus, it will be appreciated that the electron spin energy $E_e$ may be made comparable to the nuclear spin energy $E_n$ by making the electron spin g-factor, $g_e$, comparable to the nuclear spin g-factor, $g_n$, at which time the electron spins and nuclear spins may interact by undergoing mutual spin flips, as noted hereinbefore. Furthermore, in an isentropic process, the ratio:

$$g_e \beta H / T_e$$

is a constant such that if the electron spin g-factor, $g_e$, can be made relatively large in one atomic state of the crystal and then made relatively small (for example, equal to the nuclear spin g-factor, $g_n$) in a second atomic state of the crystal, there is an accompanying substantial reduction in the electron spin temperature $T_e$. More explicitly, assume that in state 1 of the crystal the electron spin g-factor, $g_{e_1}$, is substantially greater than the electron spin g-factor, $g_{e_2}$, in state 2, and that the electron spin g-factor, $g_{e_2}$, is approximately equal to the nuclear spin g-factor, $g_n$. In other words, $g_{e_1} \gg g_{e_2} \approx g_n$. Then, in an isentropic conversion from state 1 to state 2, the state 2 electron spin temperature, $T_{e_2}$, is given by:

$$T_{e_2} = T_{e_1}\left(\frac{g_{e_2}}{g_{e_1}}\right) \approx T_{e_1}\left(\frac{g_n}{g_{e_1}}\right)$$

In the method of the present invention, the state 1 electron spin temperature $T_{e_1}$ is equal to the lattice temperature, $T$, and thus the state 2 electron spin temperature, $T_{e_2}$, is reduced from the lattice temperature in inverse relation to the state 1 and state 2 electron spin g-factors. More particularly, $$T_{e_1} = \frac{g_{e_2}}{g_{e_1}} T$$

Furthermore, since the state 2 electron spin g-factor, $g_{e_2}$, is comparable to the nuclear spin g-factor, $g_n$, the reduced electron spin temperature, $T_{e_2}$, is effective in cooling the nuclear spins.

Figure 3:
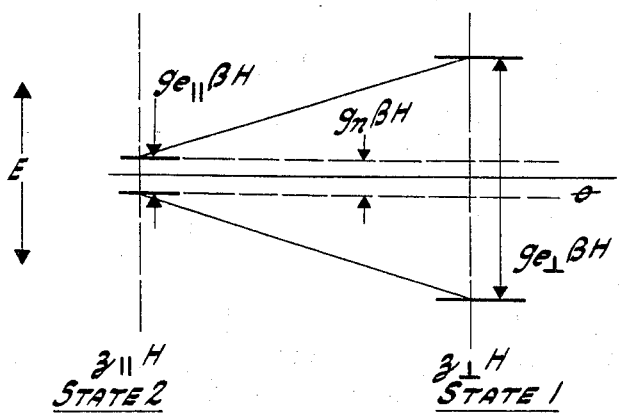

Various hydrated crystals containing a small fraction of paramagnetic ions are known which possess an appreciable anisotropy (angular dependency) of electron spin g-factor, as well as an appreciable anisotropy of electron spin-lattice relaxation time. Consequently, the method of the present invention is applicable to such crystals inasmuch as the above-noted variation in electron spin g-factor and electron spin-lattice relaxation time between two atomic states of the crystal may be made to occur by variation of an external macroscopic parameter, namely, the angular orientation of the crystal with respect to the applied external magnetic field. More particularly, referring to FIGURE 3, the crystal z-axis is oriented perpendicular to the external magnetic field, H, to establish state 1 wherein the election spin g-factor, $g_{e_\perp}$, is appreciably greater than the nuclear spin g-factor, $g_n$, while at the same time the electron spin-lattice relaxation time is very short. Orientation of the crystal z-axis parallel to the magnetic field, H, establishes state 2 wherein the electron spin g-factor, $g_{e_\parallel}$, is substantially equal to the nuclear spin g-factor, $g_n$, and the electron spin-lattice relaxation time is very long. Consequently, with the crystal z-axis oriented perpendicular to the magnetic field (state 1), the electron spins are only in contact with the crystal lattice and assume the lattice temperature, $T$. This is comparable to the condition of the arrangement depicted in FIGURE 1, wherein switch $S_1$ is closed and switch $S_2$ is open. Now, upon rotation of the crystal to orient the crystal z-axis parallel to the magnetic field, H (state 2), the electron spins are isentropically cooled to a temperature, $T_e$, which is given by:

$$T_e = T\left(\frac{g_{e_\parallel}}{g_{e_\perp}}\right)$$

At the same time, this brings the electron spins into thermal contact with the nuclear spins, by virtue of the electron spin and nuclear spin g-factors being selected such that, $g_{e_\parallel}$, is approximately equal to $g_n$. This, of course, corresponds to a condition of the schematic illustration of FIGURE 1 wherein switch $S_2$ is closed and switch $S_1$ is open. By virtue of the near equality of the electron spin and nuclear spin g-factors, $g_{e_\parallel}$, and $g_n$, the electron spins quickly undergo mutual spin flips with neighboring nuclear spins. The nuclear spin system and electron spin system reach a common temperature T' which is given by:

$$T' = \frac{T(N_n + N_e)}{N_n + N_e\left(\frac{g_{e_\perp}}{g_{e_\parallel}}\right)}$$

where $N_e$ and $N_n$ are the relative numbers of electron and nuclear spins, respectively, in the crystal. The crystal is next rotated to its original orientation wherein the crystal z-axis is perpendicular to the magnetic field, H. The electron spins are quickly cooled to the lattice sink temperature T, but inasmuch as the nuclear spins are isolated, they maintain their temperature at T'. Upon repeating the foregoing cycle many times, each time cooling the nuclear spins a slight amount, the nuclear spins reach a final temperature, $T_n$, which is given by:

$$T_n = T\left(\frac{g_n}{g_e}\right)$$

Figure 4:
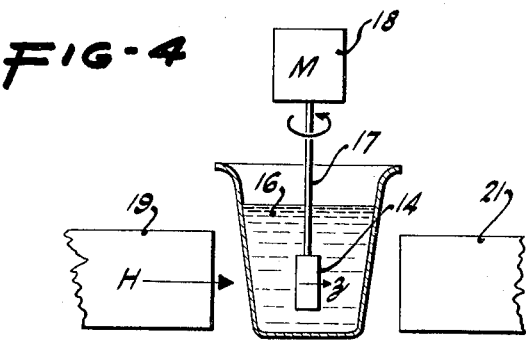

From the foregoing, it will be appreciated that the method of the present invention may be conducted with crystals having appropriate anistropy of g-factor and electron spin-lattice relaxation time, in the manner depicted in FIGURE 4. More particularly, the crystal 14 may be immersed in a bath 16 of liquid helium. The immersed crystal is then continuously rotated about an axis perpendicular to its z-axis, as by means of shaft 17 secured to the crystal and rotated by a motor 18. The external magnetic field H is generated perpendicular to the rotational axis of the crystal, for example by pole pieces 19 and 21 disposed perpendicular to the shaft 17. Thus, as the crystal 14 is rotated, its z-axis is alternately perpendicular to the magnetic field H, and in alignment therewith, each 90° of rotation. Thus, simply by rotating the crystal in the liquid helium bath and magnetic field, substantially reduced nuclear spin temperatures approaching zero degrees absolute are obtained. Moreover, it can be shown that the nuclear spin polarization, P, is given by:

$$P = \tanh\left[\frac{g_n \beta H}{2KT\left(\frac{g_{e_\parallel}}{g_{e_\perp}}\right)}\right]$$

K being the Boltzmann constant. Accordingly, for values of electron spin g-factor, $g_{e_\perp}$ substantially greater than the electron spin g-factor, $g_{e_\parallel}$ and nuclear spin g-factor $g_n$, the nuclear spin polarization, P, is relatively high and approaches, for example, 80%.

Various hydrated crystals containing paramagnetic ions in dilute amounts possess properties which are conducive to nuclear spin cooling in accordance with the method of the present invention as conducted in the manner depicted in FIGURE 4, and just described. For example, the nuclear spin cooling method may be conducted with crystals of Ce in $La_2Mg_3(NO_3)_{12} \cdot 24H_2O$, or preferably with crystals of Yb in $La(C_2H_5SO_4)_3 \cdot 9H_2O$.

Figure 5:
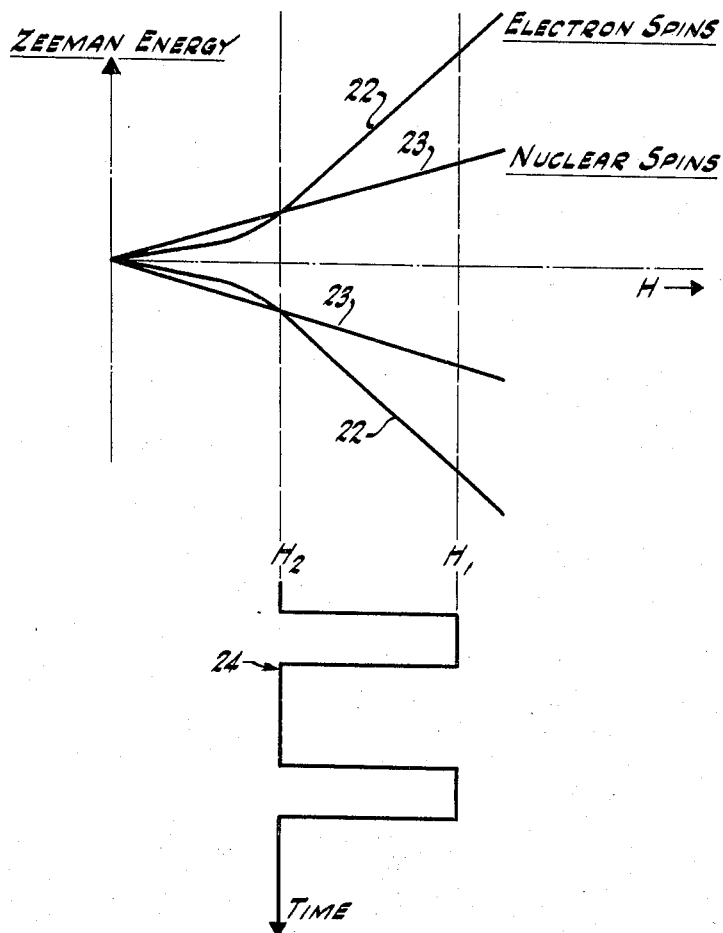

Considering now an alternative mode of conducting the nuclear spin cooling method of the invention, it should be noted that varied magnitudes of the applied external magnetic field may be employed as the external macroscopic parameter for establishing, and switching between, atomic states in the crystal conducive to the conduct of the cooling cycle. In this regard, various crystals contain paramagnetic ions for which the Zeeman energy splitting in a magnetic field, H, depends on $H^2$ or $H^3$, rather than on H, as in the case previously described. Referring to FIGURE 5, the energy of the electron spins associated with the paramagnetic ions varies with respect to the applied external magnetic field H in an exponential manner, as depicted by the electron spin energy curves 22. The nuclear spins, however, have a linear energy dependence on applied magnetic field and, accordingly, the nuclear spin energy is as depicted by the lines 23. At a relatively high value of magnetic field, $H_1$, the energy of the electron spins is considerably greater than that of the nuclear spins by virtue of the exponential variation of electron spin energy as compared to the linear variation of nuclear spin energy. In other words, for the magnetic field magnitude, $H_1$, the electron spin $g$-factor is considerably greater than the nuclear spin $g$-factor and, accordingly, the probability of interaction between the electron and nuclear spins is very low. At a relatively low magnetic field magnitude, $H_2$, however, the nuclear spin energy and electron spin energy coincide, and therefore the electron and nuclear spin $g$-factors are equal. The electron spins and nuclear spins are then able to undergo mutual spin flips such that a good degree of thermal contact is established therebetween. The conversion of electron spin energy from that existing for magnetic field magnitude, $H_1$, to that existing for magnetic field magnitude $H_2$, is isentropic such that the electron spin temperature is manifestly reduced. In addition, the electron spin-lattice relaxation time characteristics of the crystal are such that for magnetic field magnitude, $H_1$, the relaxation time is relatively short while for the field magnitude, $H_2$, the relaxation time is relatively long. Thus, the spin cooling method of the invention may be conducted by pulsing the applied magnetic field periodically between the magnitudes $H_2$ and $H_1$, as depicted by the magnetic field wave form 24. With the pulsed magnetic field 24 initially of magnitude $H_1$, the electron spin-lattice relaxation time is short and the electron spin system is consequently in good thermal contact with the crystal lattice. At the same time, the electron spin $g$-factor is considerably greater than the nuclear spin $g$-factor such that the electron spin system is effectively decoupled from the nuclear spin system. As the pulsed magnetic field assumes the lower magnitude, $H_2$, the electron spins are isentropically cooled to a temperature considerably lower than that of the crystal lattice. For magnitude, $H_2$, of the pulsed magnetic field, the electron spin-lattice relaxation time is long to thus effectively decouple the electron spin system from the lattice, while at the same time the electron spin and nuclear spin $g$-factors are equal to thereby couple the electron spin system to the nuclear spin system. The nuclear spins are cooled by the relatively low temperature electron spins with the electron spins warming irreversibly in process. When the magnetic field is again pulsed to the magnitude, $H_1$, the electron spin system is again effectively decoupled from the nuclear spin system and is effectively coupled to the crystal lattice. The electron spins are, accordingly, cooled to the lattice temperature preparatory to another cooling cycle while the temperature of the nuclear spins remains at a reduced value. Thus, the nuclear spins are cooled a little each cycle of the pulsed magnetic field until an optimumly low nuclear spin temperature is attained. It will be thus appreciated that the pulsed magnetic field is effective in controlling the so-called atomic state thermal switches within the crystal in the conduct of the nuclear spin cooling method.

It will be appreciated that the nuclear spins of crystals which are cooled or polarized in accordance with the method of the present invention may vary considerably as to nuclear spin-lattice relaxation time. In this regard, the relaxation time may be such that subsequent to termination of the cooling method, the reduced nuclear spin temperature and polarization are maintained for a period of hours or days. Such period of time is, of course, quite adequate for the conduct of various nuclear scattering experiments, or the like, in which the crystal may be, for example, employed as a target. With some crystals, the relaxation time may be only of the order of seconds or fractions of seconds such that the spin cooling method must be continued during the employment thereof in a given application. In this regard, a crystal having a very short nuclear spin-lattice relaxation time may be, for example, employed as a target of a pulsed accelerator beam. In this case, the nuclear spin cooling method may thus be accomplished by means of the pulsed external magnetic field with the magnetic field pulses being oppositely phased with respect to the beam pulses. In this manner, the crystal is polarized and is thereafter immediately impinged by the accelerator beam pulse before the spin polarization has had an opportunity to decay appreciably.

Although the present invention has been described hereinbefore with respect to specific steps of the method thereof, it will be appreciated that numerous variations and modifications may be made therein without departing from the true spirit and scope of the invention, and thus it is not intended to limit the invention except by the terms of the following claims.

What is claimed is:

1. A method of nuclear spin cooling comprising the steps of maintaining a crystal containing a dilute amount of paramagnetic ions at a sink temperature slightly greater than 0° K. in a magnetic field, alternately establishing first and second atomic states in said crystal respectively wherein the electron spins of said crystal are in good thermal contact with the lattice of the crystal while the electron spins are in very poor thermal contact with the nuclear spins of the crystal and wherein the electron spins are in very poor thermal contact with said lattice while the electron spins are in good thermal contact with the nuclear spins, and isentropically cooling said electron spins simultaneously with conversion from said first state to said second state, whereby in the first state of said crystal the electron spins are cooled to said sink temperature, the electron spins are cooled to a reduced temperature during conversion from the first to the second state, and in the second state of said crystal said nuclear spins are cooled by said electron spins to a temperature less than said sink temperature.

2. A method of orienting nuclear spins comprising the steps of disposing a crystal having an electron spin wave function dependent on predetermined macroscopic parameters in a reservoir at a temperature slightly greater than 0° K., establishing a magnetic field in the proximity of said crystal, and varying said predetermined macroscopic parameters to in turn alternately vary said spin wave function between a first state wherein the electron $g$-factor is appreciably greater than the nuclear spin $g$-factor and the electron spin-lattice relaxation time is relatively short and a second state wherein the electron spin $g$-factor is substantially equal to the nuclear spin $g$-factor and the electron spin-lattice relaxation time is relatively long, whereby the nuclear spins of said crystal are at all times isolated from said reservoir while in said first state said electron spins are in thermal contact with said reservoir and isolated from said nuclear spins to be cooled to the temperature of said reservoir and in said second state said electron spins are in thermal contact with said nuclear spins and isolated from the lattice, said electron spins being cooled by adiabatic demagnetization during variation of said wave function between said first and second states thereof.

3. A nuclear polarization method comprising the steps of providing a hydrated crystal containing paramagnetic ions possessing an appreciable anisotropy of electron spin g-factor and an appreciable anisotropy of electron spin-lattice relaxation time, disposing said crystal in a reservoir at liquid helium temperatures, establishing a magnetic field in the region of said crystal, positioning said crystal in a first orientation with respect to said field such that the electron spin g-factor is substantially greater than the nuclear spin g-factor and the electron spin-lattice relaxation time is relatively short to thereby establish thermal contact between the electron spins and said reservoir by direct paramagnetic relaxation while decoupling the electron spins from the nuclear spins, positioning said crystal in a second orientation with respect to said field such that the electron spin g-factor is substantially equal to the nuclear spin g-factor and the electron spin-lattice relaxation time is relatively long to thereby establish thermal contact between the electron spins and the nuclear spins by dipole-dipole coupling while decoupling the electron spins from the lattice, and cyclically alternately varying the position of said crystal between said first and second orientations, said electron spins being isentropically cooled to a temperature less than that of said reservoir by adiabatic demagnetization during positional variation of said crystal from said first to said second orientation, said electron spins cooling said nuclear spins in said second orientation and being irreversibly warmed, said electron spins being cooled to the temperature of said reservoir in said first orientation.

4. A method of cooling nuclear spins comprising the steps of providing a hydrated crystal containing a small fraction of paramagnetic ions, said paramagnetic ions having associated electron spins with a relatively short electron spin-lattice relaxation time when the crystal is in a first position wherein a predetermined axis of the crystal is oriented perpendicular to an external magnetic field and a relatively long electron spin-lattice relaxation time when the crystal is in a second position wherein said predetermined axis of the crystal is oriented parallel to an external magnetic field, said paramagnetic ions having an appreciable angular dependency of electron spin g-factor according to which the electron g-factor is substantially greater than the nuclear spin g-factor when said crystal is in said first position while the electron spin g-factor is substantially equal to the nuclear spin g-factor when said crystal is in said second position, and rotating said crystal in a reservoir at liquid helium temperatures and in a uniform magnetic field about an axis normal to said predetermined axis of said crystal and to said field to thereby cyclically establish thermal contact between said electron spins and said reservoir in said first position, adiabatically cool the electron spins during rotation of the crystal from said first to said second position, establish thermal contact between the cooled electron spins and the nuclear spins in said second position to in turn cool the nuclear spins, ans effectively decouple the electron spins from the nuclear spins during rotation of the crystal from said second to said first position.

5. The method of claim 4, wherein said crystal is ytterbium in lanthanum ethyl sulfate hydrate.

6. A nuclear spin cooling method comprising the steps of providing a crystal containing paramagnetic ions having a Zeeman energy splitting greater than unity exponential dependency on an applied external magnetic field, said paramagnetic ions thereby having associated electron spins with a g-factor which varies from a value substantially greater than the nuclear spin g-factor at a first relatively high magnitude of magnetic field to a value equal to the nuclear spin g-factor at a second relatively low magnitude of magnetic field, said crystal having an electron spin-lattice relaxation time which varies from a relatively short time for said first magnitude of magnetic field to a relatively long time for said second magnitude of magnetic field, maintaining said crystal at a temperature slightly greater than zero degrees absolute, and generating a pulsed magnetic field in the vicinity of said crystal which cyclically varies between said first and second magnitudes.

References Cited by the Examiner
UNITED STATES PATENTS 3,125,861   3/1964   Jaep _____ 62—3

OTHER REFERENCES

Abragam et al.: Physical Review, vol. 109, No. 5, March 1, 1958, pp. 1441–1458 incl.

Abragam, Cryogenics, vol. 3, No. 1, March 1963, pp. 42 and 43.

Estle et al.: Physical Review, vol. 112, No. 5, Dec. 1, 1958, pp. 1576–1586 incl.

Hudson: Science, vol. 134, No. 3492, Dec. 1, 1961, pp. 1733–1736 incl.

WALTER L. CARLSON, *Primary Examiner*.

MAYNARD R. WILBUR, CHESTER L. JUSTUS,
*Examiners.*

A. E. RICHMOND, *Assistant Examiner*.